US010841850B1

(12) United States Patent
Crespi et al.

(10) Patent No.: US 10,841,850 B1
(45) Date of Patent: *Nov. 17, 2020

(54) SEAMLESS WI-FI ROAMING RECORD UPDATE

(71) Applicant: CSC HOLDINGS, LLC, Bethpage, NY (US)

(72) Inventors: Edgar Crespi, Weston, CT (US); James Digangi, Nesconset, NY (US); Michael Olavarria, East Northpoint, NY (US); Paul Hess, Rocky Point, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,464

(22) Filed: Mar. 28, 2019

Related U.S. Application Data

(63) Continuation of application No. 15/215,198, filed on Jul. 20, 2016, now Pat. No. 10,251,107.

(51) Int. Cl.
| | |
|---|---|
| *H04W 36/18* | (2009.01) |
| *H04W 36/08* | (2009.01) |
| *H04W 12/06* | (2009.01) |
| *H04W 36/00* | (2009.01) |
| *H04L 29/12* | (2006.01) |
| *H04W 84/12* | (2009.01) |

(52) U.S. Cl.
CPC ............ *H04W 36/18* (2013.01); *H04L 61/10* (2013.01); *H04L 61/2015* (2013.01); *H04W 12/06* (2013.01); *H04W 36/0016* (2013.01); *H04W 36/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,625,532 B2 | 1/2014 | Kuehnel | |
| 8,761,142 B2 | 6/2014 | Dayanandan et al. | |
| 9,226,225 B2 | 12/2015 | Elliott | |
| 9,642,055 B2 | 5/2017 | Vallabhu et al. | |
| 9,716,999 B2 | 7/2017 | Zhang et al. | |
| 9,906,940 B2 | 2/2018 | Gupta et al. | |

(Continued)

*Primary Examiner* — Michael J Moore, Jr.
(74) *Attorney, Agent, or Firm* — Sterne, Kessler, Goldstein & Fox P.L.L.C.

(57) ABSTRACT

Embodiments enable seamless Wi-Fi roaming by providing a user with a single username that is associated with a set of resources in the seamless network that includes different Wi-Fi networks (e.g., Wi-Fi networks with different domain names). As a user travels from a first access point in a first Wi-Fi network to a second access point in a second Wi-Fi network within the seamless network, network elements in the seamless network may recognize the user's single username as an already established session (e.g., with the first access point) and direct traffic accordingly to the second access point. Embodiments also satisfy business requirements by updating accounting data accordingly by indicating that the user accessed the seamless network from the first Wi-Fi network. Embodiments allow a user roaming on the seamless network to experience the policies and network requirements associated with the Wi-Fi domain of the second access point.

20 Claims, 5 Drawing Sheets

(56) References Cited

U.S. PATENT DOCUMENTS

| | | |
|---|---|---|
| 10,251,107 B1 | 4/2019 | Crespi et al. |
| 2007/0160017 A1 | 7/2007 | Meier et al. |
| 2007/0180088 A1 | 8/2007 | Zhao |
| 2009/0177785 A1 | 7/2009 | Reid et al. |
| 2013/0312074 A1* | 11/2013 | Sarawat .......... H04W 12/04031 726/7 |
| 2014/0051391 A1 | 2/2014 | Torres et al. |
| 2014/0119267 A1 | 5/2014 | Santhanam et al. |
| 2014/0233374 A1* | 8/2014 | Elliott .................. H04W 48/16 370/228 |
| 2014/0235244 A1 | 8/2014 | Hinman |
| 2017/0353983 A1 | 12/2017 | Grayson et al. |

* cited by examiner

SEAMLESS WI-FI ROAMING RECORD UPDATE

CROSS-REFERENCE TO RELATED APPLICATION

This application is a continuation of U.S. patent application Ser. No. 15/215,198, filed on Jul. 20, 2016, which is hereby incorporated by reference in its entirety.

BACKGROUND

Field

Embodiments generally relate to roaming on discontinuous Wi-Fi networks.

Background Art

Wi-Fi networks have their own network requirements and authentication. As a client device moves from a first Wi-Fi network to a second Wi-Fi network, the user typically experiences a service interruption (e.g., video streaming stops, voice call drops, web page does not load) as the client device disassociates with the first Wi-Fi network and proceeds to associate with the second Wi-Fi network.

BRIEF SUMMARY OF THE INVENTION

Embodiments create a seamless network that includes two or more Wi-Fi networks. When a user moves from an access point in a first wireless network to an access point in a second wireless network, embodiments enable the user to maintain network connectivity using the same network resources, without service interruption. A user may experience a unique portal/policy associated with the Wi-Fi network of the access point from which they connect to the seamless network, and the user may move throughout the seamless network without having to re-authenticate or re-acquire network resources. In addition, records are updated to support a range of business requirements (e.g., billing and accounting).

Embodiments include a system, method, and a computer program product that maps a source access point identifier with a corresponding Wi-Fi network having a set of policies or network requirements. The corresponding Wi-Fi network is one of at least two Wi-Fi networks that comprise a seamless Wi-Fi network. Embodiments include receiving a first communication that identifies the source access point, and a unique identifier of a user of a client device, where the client device is associated with the source access point. Based on the source access point identifier, embodiments identify the corresponding Wi-Fi network, and determine that a session is already established with the client device, where the client device is associated with a different access point on a different Wi-Fi network, and the different Wi-Fi network is one of at least two Wi-Fi networks that comprise the seamless Wi-Fi network. Embodiments also transmit a second communication that allows communications to continue via the session already established, where the communications satisfy the set of policies or network requirements of the corresponding Wi-Fi network. Embodiments also determine that the session is already established with the client device when a timing threshold value is satisfied. Embodiments transmit a third communication identifying the unique identifier of the user and the corresponding Wi-Fi network to satisfy accounting purposes. In some embodiments, the source access point identifier is an IP address of the source access point, and the unique identifier of the user includes: a username, an IP address, or a unique ID.

Some embodiments include receiving a first communication that identifies the source access point, and a unique identifier of a user of a client device, where the client device is associated with the source access point, and determining, based on an identifier of the source access point, a corresponding Wi-Fi network that has a set of policies or network requirements, wherein the corresponding Wi-Fi network is one of at least two Wi-Fi networks that comprise a seamless Wi-Fi network. Embodiments include determining that the client device has not already established a session, electronically transmitting a second communication to authenticate the client device, and electronically transmitting a third communication that allows communications, wherein the communications satisfy the set of policies or network requirements of the corresponding Wi-Fi network.

In response to the second communication, embodiments include determining that the client device fails authentication, changing a charging rule to identify the portal site of the corresponding Wi-Fi network accessible by the client device, and electronically transmitting a fourth communication including the changed charging rule.

Embodiments may include receiving a fifth communication affiliated with the portal site, comprising user credentials, and electronically transmitting a sixth communication comprising the user credentials to obtain authorization. The user credentials may include payment data. Embodiments also include receiving in response to the sixth communication, an authorization of the user credentials, electronically transmitting a response to the fifth communication indicating the authorization of the user credentials, and receiving a response to the third communication confirming receipt.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

DETAILED DESCRIPTION OF THE INVENTION

Embodiments enable seamless Wi-Fi roaming by providing a user of a client device with a single username that that is associated with a set of resources in the seamless network that includes different Wi-Fi networks (e.g., Wi-Fi networks with different domain names). As the client device and/or the user travel from a first access point in a first Wi-Fi network within the seamless network to a second access point in a second Wi-Fi network within the seamless network, the seamless network may recognize the single username as an already established session (e.g., with the first access point) and direct traffic accordingly to the second access point while continuing the established session. Embodiments also satisfy business requirements by updating accounting data accordingly by indicating that the user accessed the seamless network from the first Wi-Fi network, and subsequently accessed the seamless network from the second Wi-Fi network.

Figure 1:
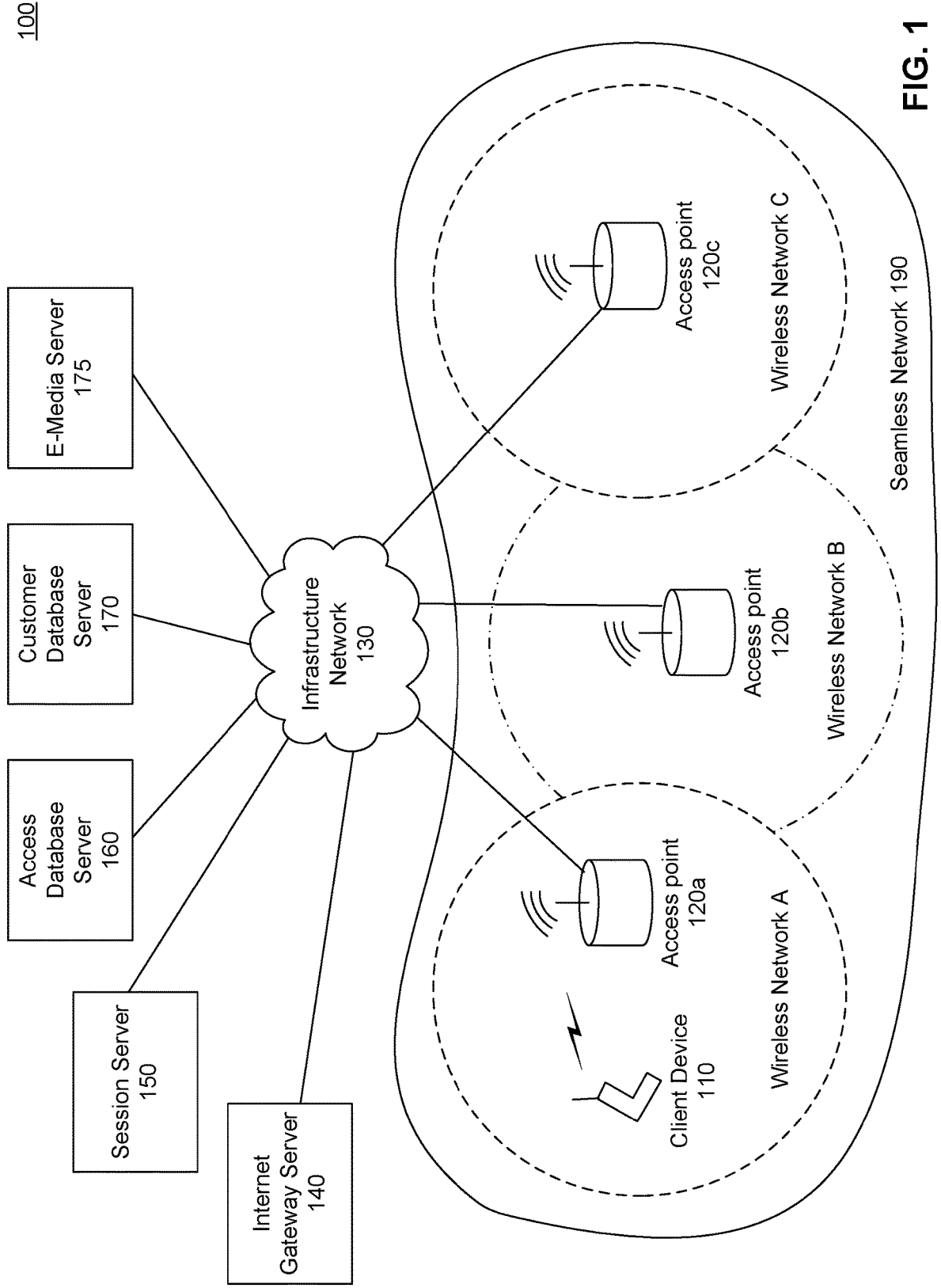
FIG. 1 illustrates an example system according to an embodiment.

FIG. 1 illustrates an example system 100 according to an embodiment. System 100 includes client device 110, access points 120a-120c, infrastructure network 130, Internet gateway server 140, session server 150, access database 160, customer database 170, E-media server 175, and seamless network 190. Client device 110 may include, but is not limited to, a cellular phone, a smart phone, a tablet, a personal digital assistant (PDA), or a laptop. An access point 120a-120c may include, but is not limited to, a router, a mobile access Internet gateway, or a hotspot device (e.g., a smart phone that provides access to a Wi-Fi network). Access point 120a is associated with Wi-Fi network A, access point 120b is associated with Wi-Fi network B, and access point 120c is associated with Wi-Fi network C. Together, Wi-Fi networks A-C make up seamless network 190.

Infrastructure network 130 may include, but is not limited to, one or more of a transport network (e.g., hybrid fiber-coaxial (HFC) network, fiber optics, etc.), cable headend network elements such as a cable modem termination system (CMTS), local area networks (LANs), metropolitan area networks (MANs), Wide area networks (WANs) and/or wireless LANs (WLANs). Internet gateway server 140 may be a local mobility anchor (LMA), for example. Session server 150 includes policy rules associated with the Wi-Fi networks A-C in seamless network 190. Exchanges between Internet gateway server 140 and session server 150 may include Diameter protocol exchanges. Access database 160 may include a RADIUS server, and/or perform RADIUS protocol validation and identification protection functions. Exchanges between session server 150 and access database 160 may include RADIUS protocol exchanges. Access database 160 may access customer database server 170. Exchanges between access database 160 and customer database server 170 may include customer database protocol exchanges. Session server 150 and access database 160 together provide authentication, authorization, and accounting functions.

Conventionally, each Wi-Fi network from among the Wi-Fi networks A-C has its own policy and network requirements. For example, a user associated with Wi-Fi network A experiences a particular access speed and portal site A, while a user associated with Wi-Fi network B experiences a different access speed and a different portal site B. Accordingly, a user associated with a respective Wi-Fi network would have a domain-specific username and domain-specific network resources associated with that user as shown in Table 1 below:

Conventionally, when client device 110 moves from a Wi-Fi network A to Wi-Fi network B, client device 110 experiences a service interruption (e.g., video streaming stops, voice call drops, web pages do not load). This service interruption occurs as client device 110 ends a session with Wi-Fi network A and is re-authenticated and assigned to Wi-Fi network B to establish a different session.

Instead of experiencing service interruptions while establishing different sessions using different sets of network resources as a user moves and from Wi-Fi network A to Wi-Fi network B, embodiments enable a seamless routing experience for the user. Embodiments bring the different domains of the Wi-Fi networks A-C into a single realm. Instead of three of the above domain names, embodiments utilize a username for the single realm, username@seamless.com. And, the user is assigned to one set of resources under the single username regardless of which Wi-Fi network the user traverses in seamless network 190:

Seamless Network 190
username@seamless.com
IP address D
GRE KEY D
Unique ID D

As client device 110 in Wi-Fi network A travels from access point 120a in Wi-Fi network A to access point 120b in Wi-Fi network B within seamless network 190, network elements in seamless network 190 recognize the user's single username, username@seamless.com. When embodiments determine that the user has an existing session, the associated traffic is directed accordingly, to access point 120b. When an existing session is not established, embodiments authenticate the user before permitting access to seamless network 190. When the user's authentication fails (e.g., the user is not yet a customer) embodiments direct the user to a portal page associated with the source access point 120, in this case, access point 120b. Once on the portal page, the user may provide credentials to be authenticated and subsequently access seamless network 190. The user experiences the network policies and network requirements (e.g., access speed) of the Wi-Fi network in which the source access point is located.

Embodiments also satisfy business requirements by updating accounting data accordingly, for example, by indicating that the user accessed seamless network 190 from access point 120a in Wi-Fi network A, and subsequently, that the user accessed seamless network 190 from access point 120b in Wi-Fi network B.

Figure 2:
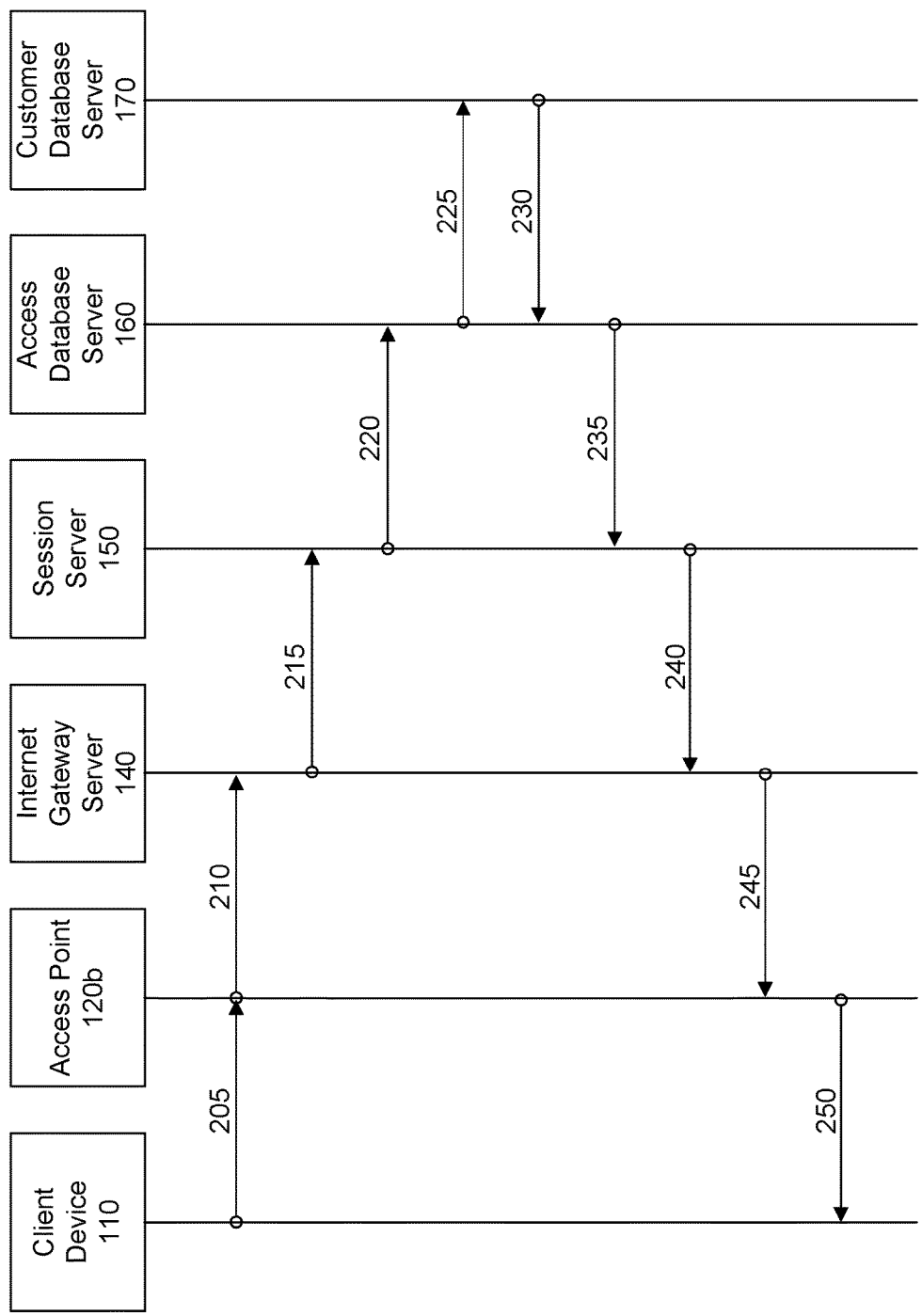
FIG. 2 illustrates an example authentication call flow according to an embodiment.

FIG. 2 illustrates an example authentication call flow 200 according to an embodiment. As an example and not a limitation, example authentication call flow 200 may be described using elements of FIG. 1. In example authentication call flow 200, a user using client device 110 is registered in customer database 170. Example authentication call flow 200 begins.

TABLE 1

| Wi-Fi Network A | Wi-Fi Network B | Wi-Fi Network C |
|---|---|---|
| username@wifia.seamless.com | username@wifib.seamless.com | username@wific.seamless.com |
| IP address A | IP address B | IP address C |
| Generic routing encapsulation (GRE) KEY A | GRE KEY B | GRE KEY C |
| Unique ID A | Unique ID B | Unique ID C |

At operation 205, client device 110 associates with access point 120*b* of Wi-Fi network B. Client device 110 may request an IP address (e.g., initiate a dynamic host configuration protocol discovery (DHCPDISCOV) message) to continue a session previously established on Wi-Fi network A or begin a session on Wi-Fi network B.

At operation 210, access point 120*b* receives the IP address request, and initiates a session request with Internet gateway server 140. As an example, access point 120*b* may initiate a tunnel protocol such as Generic Routing Encapsulation (GRE)-encapsulated, and the session request may be a PMIPv6 proxy binding update message.

At operation 215, Internet gateway server 140 receives the request from access point 120*b* to access seamless network 190, and electronically transmits a query message to session server 150. To support a reporting business rule for updating billing and accounting records and a portal selection business rule, the query message may include data such as a) the source access point's IP address, which in this example, is the IP address of access point 120*b*; and b) a unique identifier of the user (e.g., username@seamless.com). In some embodiments the user's unique identifier may include IP address D and/or Unique ID. The query message may also identify seamless network 190 as the called station. The query message may be a Diameter protocol credit-control request message.

At operation 220, session server 150 receives the query message from Internet gateway server 140 that includes an IP address of the source access point 120*b*, the unique identifier of the user, and/or client device (e.g., MAC address). Session server 150 maintains customer reference data in a list (e.g., a table) that maps each access point 120 with a respective portal page (e.g., access point 120*a* corresponds with a portal page for Wi-Fi network A, access point 120*b* corresponds with a portal page for Wi-Fi network B, etc.) When a query message is received, the customer reference data table is checked and updated to associate the user's unique identifier and/or client device 110 with the source access point 120 (e.g., access point 120*a*, 120*b*, or 120*c*) and/or a corresponding portal page. The customer reference table may include the user's unique identifier, a MAC address of client device 110, a source access point 120 ID, a source access point 120's IP address (e.g., received in the query message), a Wi-Fi network ID, and a corresponding portal page of the source access point 120.

To record the client device 110 attachment point to seamless network 190, session server 150 electronically transmits accounting data, such as RADIUS accounting data as an example, to a data storage system (e.g., a data warehouse not shown) for proper billing and accounting. A conventional accounting data string electronically transmitted to the data storage system includes the username from the single domain, such as username@seamless.com, which would be sent to the data storage system. In an embodiment, session server 150 rewrites the accounting data string from username@seamless.com to username@wifib.seamless.com to identify the domain in which client device 110 associated with access point 120*b* of Wi-Fi network B. The rewritten accounting data string is then sent to the data storage system. In an embodiment, the username@wifib.seamless.com is added to the conventional accounting data string.

Session server 150 determines whether a current session exists. For example, the user may be using a video streaming service, making a voice call, or a data service (e.g., web access) via a previously established session while in Wi-Fi network A. Session server 150 may check a session cache database (not shown) for an existing session using the user's unique identifier and/or a client device ID (e.g., a MAC address). When a session exists, session server 150 electronically transmits a positive authentication result to Internet gateway server 140 (e.g., at 240 below). When a current session does not exist, session server 150 electronically transmits a request to access database server 160 to authenticate the user.

At operation 225, access database server 160, electronically transmits a request to customer database server 170 to determine whether the user and/or client device 110 are registered. For example, the request may be a RADIUS access-request message. There may be one or more customer databases that are searched to determine whether a user and/or client device 110 is a customer, paid guest, free guest, and so on.

At operation 230, for this example, customer database server 170 determines that the user and/or the client device is registered, and a positive authentication result is electronically transmitted to access database server 160. The positive authentication result may be a RADIUS access-accept message, for example.

At operation 235, access database server 160 receives the positive authentication result from customer database 170, and electronically transmits the positive authentication result to session server 150. For example, the result may be a radius-accept message via RADIUS protocol.

At operation 240, session server 150 receives the positive authentication result from access database server 160, and electronically transmits a positive authentication result message to Internet gateway server 140. The message may include indications of the Wi-Fi network corresponding with the source access point, access point 120*b*, so that Internet gateway server 140 may interpret to determine which policy and network requirement should be applied. The message may be a Diameter protocol credit-control answer.

At operation 245, Internet gateway server 140 receives the positive authentication result message, interprets any indications to determine which policy and/or network requirement should be applied to traffic associated with client device 110, and electronically transmits an acknowledgment message to access point 120*b*. The message may be a PMIPv6 binding acknowledgement message.

At operation 250, client device 110 receives the message, the DHCP completes, and the user may continue using services without interruption, with the policies and network requirements of the Wi-Fi network associated with the source access point 120 (e.g., access point 120*b*). As an example, generic routing encapsulation (GRE) is a tunneling mechanism that may be used by access point 120*b* to connect to Internet gateway server 140. Once authentication has completed, subsequent user traffic is encapsulated in GRE from access point 120*b* to Internet gateway server 140. Example authentication call flow 200 ends.

Figure 3:
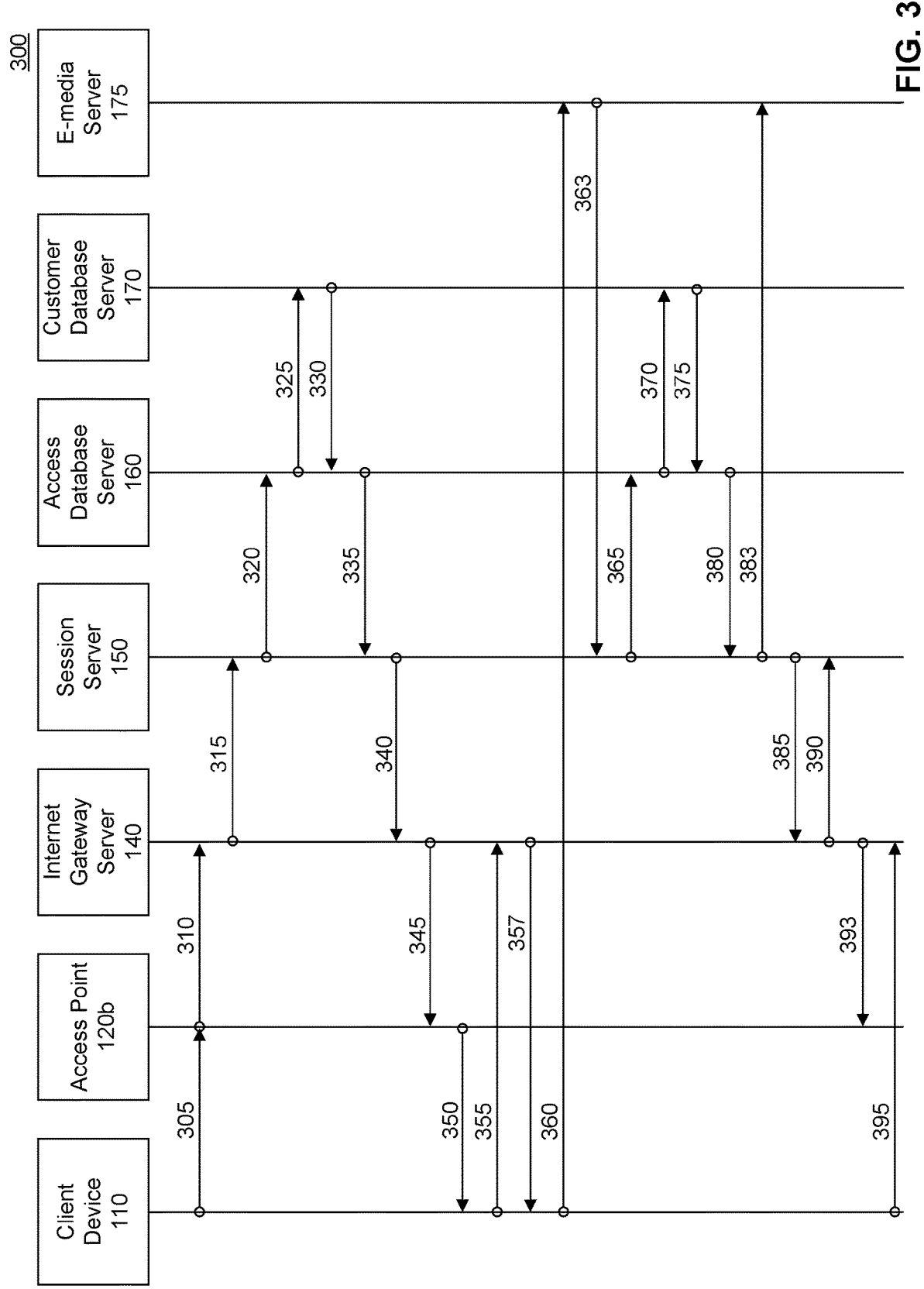
FIG. 3 illustrates an example web authentication call flow according to an embodiment.

FIG. 3 illustrates an example web authentication call flow 300 according to an embodiment according. As an example and not a limitation, example web authentication call flow 300 may be described using elements of FIG. 1. In example web authentication call flow 300, a user using client device 110 is not a registered customer in customer database 170. Example web authentication call flow 300 begins.

Example web authentication call flow 300 operations 305-325 are equivalent to operations 205-225 of example authentication call flow 200, and are not repeated here.

At operation 330, for this example, customer database server 170 determines that the user and/or the client device is not registered (e.g., queries to various customer databases return a negative result), and a negative authentication result is electronically transmitted to access database server 160.

At operation 335, access database server 160 receives the negative authentication result from customer database 170, and electronically transmits the negative authentication result to session server 150. The negative authentication result may be a RADIUS access-reject message.

At operation 340, session server 150 receives the negative authentication result from access database server 160, and changes a charging rule to indicate a specific uniform resource locator (URL) portal site. For example, a changed charging rule redirects packets from client device 110 to the URL portal site associated with source access point 120, e.g., a portal site associated with Wi-Fi Network B, so that client device 110 may be authenticated. Session server 150 electronically transmits a negative authentication result message to Internet gateway server 140 that includes the specific portal site based on the source access point 120 (e.g., access point 120*b*) that the user may access. The message may include indications of the Wi-Fi network (e.g., Wi-Fi Network B) corresponding to the source access point 120*b*, that Internet gateway server 140 may interpret to determine which policy and network requirement should be applied when the user accesses seamless network 190. The message may include a Diameter protocol credit-control answer.

At operation 345, Internet gateway server 140 receives the negative authentication result message, interprets any indications to determine which policy and network requirement should be applied to traffic associated with client device 110, and electronically transmits an acknowledgment message to access point 120*b*. As an example, the message may be a PMIPv6 binding acknowledgement message.

At operation 350, client device 110 receives the message, the DHCP completes, and the user may access specific portal sites based on the charging rule.

At operation 355, the user may select one of the specific portal sites with client device 110.

At operation 357, Internet gateway server 140 may receive HTTP traffic on Port 80 and redirect the user to the specific portal URL that corresponds to the source access point 120 as follows: Access point 120*b* in Wi-Fi network B: https://wifib.seamless.net/.

At operation 360, the user is redirected to the portal associated with access point 120*b* and the HTTP request from the user arrives at E-media server 175. The user may enter credentials (e.g., payment information, profile data).

At operation 363, E-media server 175 may electronically transmit the credentials to session server 150. The user's credentials may be electronically transmitted in a POST HTTP request via SOAP/XML.

At operation 365, session server 150 receives the credentials from E-media server 175 and electronically transmits the credentials to access database 160 (e.g., electronically transmit a RADIUS request message).

At operation 370, access database server 160 receives the credentials and forwards a query to customer database server 170 to approve the user's credentials.

At operation 375, customer database server 170 receives and processes the query to determine whether to approve the user's credentials. For this example, approval is assumed. Customer database server 170 electronically transmits a reply to access database server 160 (e.g., via a customer database protocol).

At operation 380, access database 160 receives the approval reply from customer database server 170 (e.g., a positive authentication), and electronically transmits an answer to session server 150 (e.g., via RADIUS protocol).

At operation 383, session server receives the answer from access database 160 and electronically transmits a reply to E-media server 175 to close the session.

At operation 385, session server 150 electronically transmits a reauthorization request to Internet gateway server 140 indicating that the user is approved (e.g., electronically transmit a Diameter Re-Auth request to Internet gateway server 140). In an embodiment, session server 150 changes a charging rule to allow client device 110 full access to the Internet as opposed to client device 110 being able to only access the corresponding portal site, and transmits the reauthorization request to Internet gateway server 140.

At operation 390, Internet gateway server 140 receives the reauthorization request and changes a charging rule (e.g., a Rule Base) to allow client device 110 full access to the Internet. Internet gateway server 140 electronically transmits a reauthorization answer (e.g., Diameter Re-Auth Answer) to session server 150 in reply to the reauthorization request.

At operation 393, Internet gateway server 140 electronically transmits an acknowledgment message to access point 120*b*. The message may be a PMIPv6 binding acknowledgement message.

At operation 395, the user has full access to the Internet via client device 110.

Example web authentication call flow 300 ends.

Figure 4:
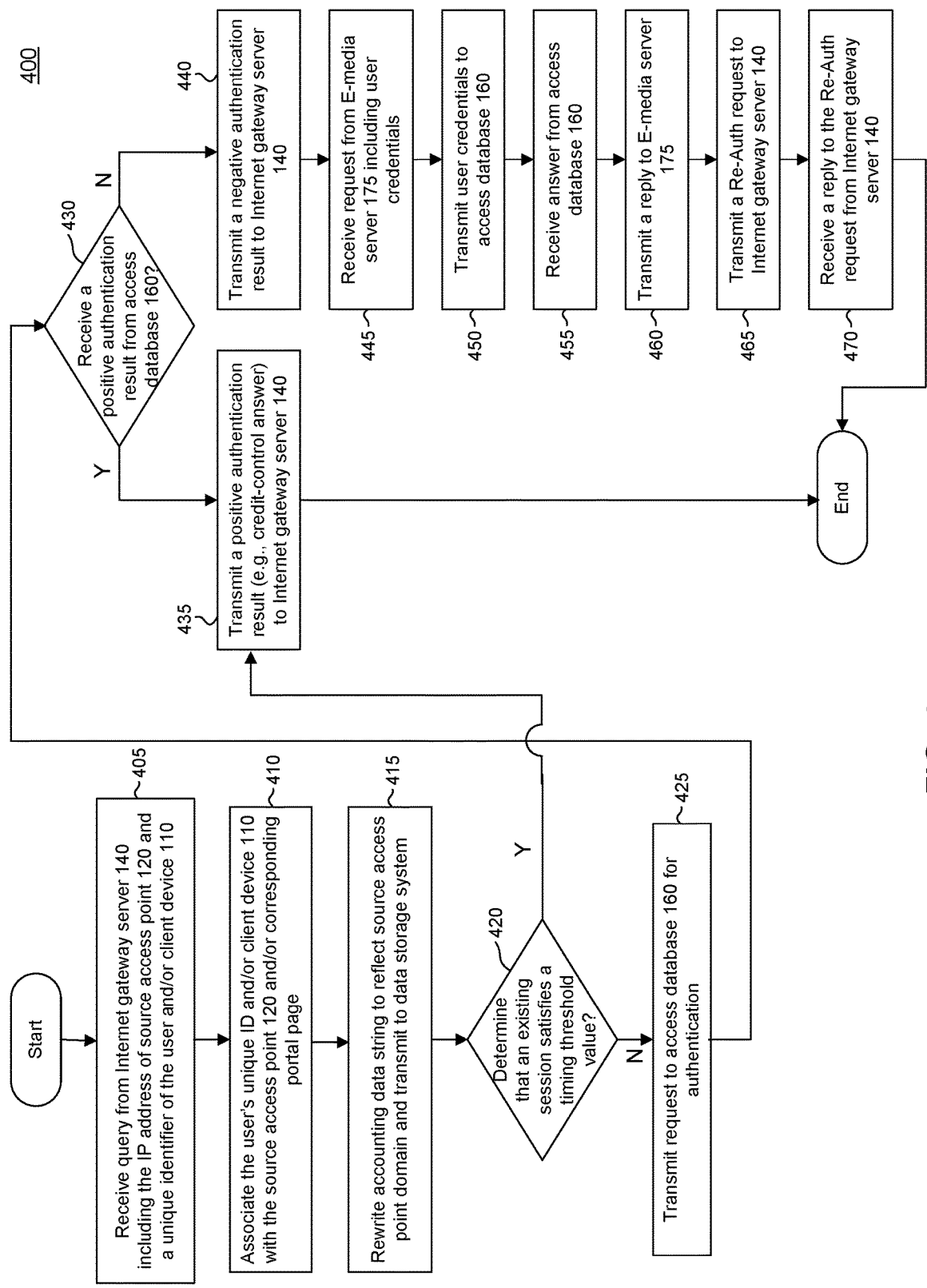
FIG. 4 illustrates a method according to an embodiment.

FIG. 4 illustrates a method 400 according to an embodiment. As an example and not a limitation, method 400 may include functions of session server 150. Method 400 begins.

At operation 405, session server 150 receives a query message from Internet gateway server 140 that includes an IP address of the source access point 120*b*, a unique identifier of the user, and/or client device (e.g., MAC address). Session server 150 maintains a customer reference data table that maps each access point 120 of seamless network 190 with a respective portal page. The IP address of access points 120*a* of Wi-Fi network A may be associated with a different range of IP addresses than access points 120*b* and 120*c*. Session server 150 may determine from the source access point 120's IP address, the corresponding Wi-Fi network. Thus, session server 150 may determine that the IP address of access point 120*b* falls within the IP address range associated with Wi-Fi network B, which maps to the corresponding portal site, https://wifib.seamless.net/. In addition, session server 150 includes various policies and network requirements for each of the Wi-Fi networks in seamless network 190.

At operation 410, session server 150 checks the customer reference data table and updates the table by associating and storing the user's unique identifier and/or client device 110 with the source access point 120 (e.g., access point 120*a*, 120*b*, or 120*c*) and/or corresponding portal page. The customer reference table may include the user's unique identifier, a MAC address of client device 110, a source access point 120's IP address (e.g., received in the query message), and a corresponding portal page of the source access point 120.

At operation 415, session server 150 rewrites the accounting data string from username@seamless.com to username@wifib.seamless.com, the domain from which the user actually attached via access point 120*b* to seamless network 190. Session server 150 electronically transmits the accounting data string to the data warehouse so that billing and accounting data reflect that the user has joined seamless network 190 at access point 120*b* in Wi-Fi network B, and will experience the policies and network requirements of Wi-Fi network B. In an embodiment, session server 150 accesses the IP address of the source access point 120 from the query data and/or the customer reference data table.

At operation 420, a determination is made whether a current session exists. For example, the user may be using a video streaming service, a voice call, or a data service (e.g., web access) via a previously established session while in Wi-Fi network A. Session server 150 may check a session cache database (not shown) to determine whether the user's unique identifier is associated with an existing session, and determine whether a settable timing threshold value is satisfied. An example of a timing threshold is 20 minutes or 2 hours. When a session already exists and the timing threshold value is satisfied, the user has recently been authenticated, and the session may continue without interruption while the user is roaming on Wi-Fi network B. Thus, the user's experience continues without establishing a new session and without having to re-authenticate the user. Method 400 proceeds to 435. When the user is not associated with an existing session, method 400 proceeds to 425.

At operation 435, session server 150 electronically transmits a positive authentication result to Internet gateway server 140. For example, a Diameter protocol credit-control answer message may be electronically transmitted that includes a string that includes one or more policy and network requirement attributes that Internet Gateway server 140 can interpret. The policy attributes may include a URL for the portal site associated with the source access point 120*b* (e.g., https://wifib.seamless.net/) and bandwidth requirements. The policy and network requirements are associated with Wi-Fi network B, the Wi-Fi network with which the source access point 120*b* is affiliated.

Returning to operation 425, when a current session does not exist and/or the timing threshold is not satisfied, session server 150 electronically transmits a request to access database server 160 to authenticate the user.

At operation 430, session server 150 determines whether a positive authentication result from access database server 160 is received. When a positive authentication result is received, method 400 proceeds to 435. When a user is not authenticated, method 400 proceeds to 440.

At operation 440, session server 150 receives the negative authentication result from access database server 160, and changes a charging rule (e.g., a Rule Base) to indicate that the user may access specific portal sites (e.g., via client device 110) such as a portal site associated with Wi-Fi Network B to be authenticated. Session server 150 electronically transmits a negative authentication result message to Internet gateway server 140 that includes a specific portal based on the source access point 120 (e.g., access point 120*b*) that the user may access. The message may include indications for the Wi-Fi network associated with source access point 120*b* that Internet gateway server 140 may interpret to determine which policy and network requirement should be applied when the user accesses seamless network 190.

At operation 445, session server 150 receives the user's credentials from E-media server 175.

At operation 450, session server 150 electronically transmits the user's credentials to access database 160.

At operation 455, session server receives an answer regarding the approval of the user's credentials from access database 160. In this example the answer is positive and the user is a customer.

At operation 460, session server 150 electronically transmits a reply to E-media server 175 to close the session.

At operation 465, session server 150 electronically transmits a reauthorization request to Internet gateway server 140 indicating that the user is approved.

At operation 470, session server receives a reauthorization answer message from Internet gateway server 140. Method 400 ends.

Figure 5:
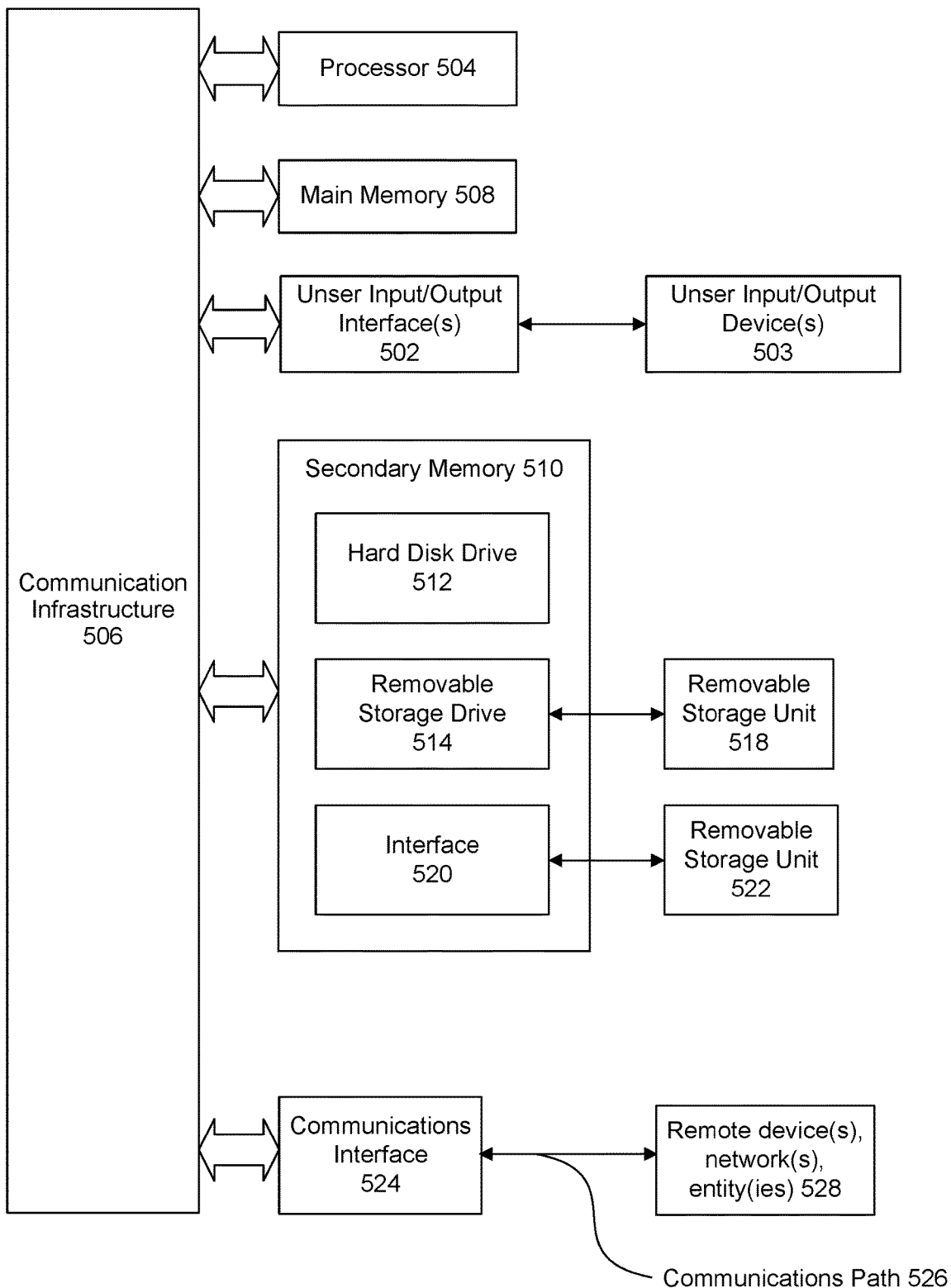
FIG. 5 illustrates an example computer system which can be used to implement an embodiment.

Various embodiments can be implemented, for example, using one or more well-known computer systems, such as computer system 500 shown in FIG. 5. Computer system 500 can be any well-known computer capable of performing the functions described herein. For example, and without limitation, session server 150 (and/or other apparatuses and/or components shown in the figures) may be implemented using computer system 500, or portions thereof.

Computer system 500 includes one or more processors (also called central processing units, or CPUs), such as a processor 504. Processor 504 is connected to a communication infrastructure or bus 506. One or more processors 504 may each be a graphics processing unit (GPU). The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be electronically transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system, comprising:
   a memory; and
   one or more processors, communicatively coupled to the memory, configured to:
   receive a first communication from a client device associated with a first access point in a first wireless network, wherein the first communication comprises a first unique username associated with a seamless Wi-Fi network;
   transmit a second communication comprising an accounting data string that correlates the first unique username associated with the seamless Wi-Fi network with a second unique username associated with the first wireless network; and
   transmit a third communication that allows the client device to continue an existing session via a second wireless network.

2. The system of claim 1, wherein the one or more processors are further configured to:
   identify a client device ID received in the first communication with the existing session in a session cache database, wherein a timing threshold value is satisfied.

3. The system of claim 2, wherein the one or more processors are further configured to:
   map the client device ID with at least one of: an ID of the first access point, an IP address of the first access point, an ID of the first wireless network, a portal site of the first wireless network, the first unique username associated with the seamless Wi-Fi network, or the second unique username associated with the first wireless network.

4. The system of claim 1, wherein the second communication satisfies accounting purposes.

5. The system of claim 1, wherein the existing session continues without service interruption and without re-authenticating a user corresponding to the client device.

6. The system of claim 1, wherein the one or more processors are further configured to:
   transmit a fourth communication to determine whether the client device is registered with the seamless Wi-Fi network; and
   receive a positive authentication result.

7. The system of claim 6, wherein prior to transmitting the fourth communication, the one or more processors are further configured to:

change a charging rule to identify a portal site of the first wireless network accessible by the client device; and transmit a fifth communication including the changed charging rule, wherein the client device is redirected to the portal site.

8. The system of claim 7, wherein the one or more processors are further configured to:

receive a sixth communication affiliated with the portal site, comprising user credentials; and transmit a seventh communication comprising the user credentials to obtain authorization.

9. The system of claim 8, wherein the user credentials include payment data.

10. The system of claim 8, wherein the one or more processors are further configured to:

receive in response to the seventh communication, an authorization of the user credentials; and transmit a response to the sixth communication indicating the authorization of the user credentials.

11. The system of claim 10, wherein the one or more processors are configured to:

determine that the client device is authenticated based on the authorization of the user credentials;

transmit a reauthorization request indicating the authorization of the user credentials; and in response to the reauthorization request transmitted, receive an acknowledgement message, wherein the charging rule is changed to allow the client device full access to the first wireless network.

12. A method, comprising:

receiving a first communication from a client device associated with a first access point in a first wireless network, wherein the first communication comprises a first unique username associated with a seamless Wi-Fi network;

transmitting a second communication comprising an accounting data string that correlates the first unique username associated with the seamless Wi-Fi network with a second unique username associated with the first wireless network; and transmit a third communication that allows the client device to continue an existing session via a second wireless network.

13. The method of claim 12, further comprising:

identifying a client device ID received in the first communication with the existing session in a session cache database, wherein a timing threshold value is satisfied.

14. The method of claim 13, further comprising:

mapping the client device ID with at least one of: an ID of the first access point, an IP address of the first access point, an ID of the first wireless network, a portal site of the first wireless network, the first unique username associated with the seamless Wi-Fi network, or the second unique username associated with the first wireless network.

15. The method of claim 12, wherein the second communication satisfies accounting purposes.

16. The method of claim 12, wherein the existing session continues without service interruption and without re-authenticating a user corresponding to the client device.

17. A non-transitory computer-readable medium having instructions stored therein, which when executed by a processor in an electronic device cause the processor to perform operations, the operations comprising:

receiving a first communication from a client device associated with a first access point in a first wireless network, wherein the first communication comprises a first unique username associated with a seamless Wi-Fi network;

transmitting a second communication comprising an accounting data string that correlates the first unique username associated with the seamless Wi-Fi network with a second unique username associated with the first wireless network; and transmitting a third communication that allows the client device to continue an existing session via a second wireless network.

18. The non-transitory computer-readable medium of claim 17, wherein the operations further comprise:

determining that a client device ID received in the first communication is identified with the existing session in a session cache database; or determining that the client device ID is identified with the existing session, and a timing threshold value is satisfied.

19. The non-transitory computer-readable medium of claim 18, wherein the operations further comprise:

mapping the client device ID with at least one of: an ID of the first access point, an IP address of the first access point, an ID of the first wireless network, a portal site of the first wireless network, the first unique username associated with the seamless Wi-Fi network, or the second unique username associated with the first wireless network.

20. The non-transitory computer-readable medium of claim 17, wherein the second communication satisfies accounting purposes.

* * * * *

UNITED STATES PATENT AND TRADEMARK OFFICE
CERTIFICATE OF CORRECTION

| | | |
|---|---|---|
| PATENT NO. | : 10,841,850 B1 | Page 1 of 1 |
| APPLICATION NO. | : 16/367464 | |
| DATED | : November 17, 2020 | |
| INVENTOR(S) | : Crespi et al. | |

It is certified that error appears in the above-identified patent and that said Letters Patent is hereby corrected as shown below:

In the Specification

In Column 5, Line 4, delete "(DHCPDISCOV)" and insert -- (DHCPDISCOVER) --, therefor.

In Column 5, Line 36, delete "etc.)" and insert -- etc.). --, therefor.

In Column 11, Line 57, delete "etc." and insert -- etc., --, therefor.

In the Claims

In Column 14, Claim 19, Line 39, delete "the operations further comprise:" and insert the same at Line 38, after "wherein" as a continuation point.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*